United States Patent [19]

O'Connor

[11] 4,440,910

[45] Apr. 3, 1984

[54] TOUGHENED CYANOACRYLATES CONTAINING ELASTOMERIC RUBBERS

[75] Inventor: John T. O'Connor, Wallingford, Conn.

[73] Assignee: Loctite Corporation, Newington, Conn.

[21] Appl. No.: 339,952

[22] Filed: Jan. 18, 1982

[51] Int. Cl.³ .................. C08L 23/08; C08L 51/06; C08L 35/04

[52] U.S. Cl. .................. 525/295; 525/244; 525/256; 525/259; 525/261; 525/266; 525/276; 524/533; 524/850

[58] Field of Search ......................................... 525/295

[56] References Cited

U.S. PATENT DOCUMENTS

| | | | |
|---|---|---|---|
| 2,794,788 | 6/1957 | Coover et al. | 260/17 |
| 3,507,822 | 4/1970 | Miyami | 260/31.8 |
| 4,038,345 | 7/1977 | O'Sullivan et al. | 525/295 |
| 4,042,442 | 8/1977 | Dombroski et al. | 525/295 |
| 4,102,945 | 7/1978 | Gleave | 525/315 |
| 4,196,271 | 4/1980 | Yamada et al. | 525/242 |
| 4,313,004 | 1/1982 | Kluger et al. | 564/491 |

OTHER PUBLICATIONS

"Cyanoacrylate Adhesives" Coover et al., B. Adhesives Materials pp. 569–579.

*Primary Examiner*—Carman J. Seccuro
*Attorney, Agent, or Firm*—Walter J. Steinkraus; Eugene F. Miller

[57] ABSTRACT

Disclosed are cyanoacrylate adhesive compositions containing elastomeric polymers as fillers. Preferred fillers are the acrylic rubbers. Filler concentration range from about 0.5–40% by weight of the composition. Beneficial results include improved toughness of the cured compositions, as measured by impact, peel and tensile strength properties, particularly after exposure elevated temperatures which would ordinarily severely degrade the adhesive strength.

8 Claims, No Drawings

TOUGHENED CYANOACRYLATES CONTAINING ELASTOMERIC RUBBERS

BACKGROUND OF THE INVENTION

1. Field of the Invention

This invention relates to cyanoacrylate adhesive compositions which are improved in toughness by incorporation of certain organic fillers or thickeners.

2. Description of the Prior Art

Liquid cyanoacrylate compositions have long been known in the art as excellent adhesives. One of their primary shortcomings, however, has been their brittleness after cure.

A variety of fillers has been incorporated into cyanoacrylate adhesive compositions to bring about certain changes in properties. U.S. Pat. No. 2,794,788 teaches thickening of cyanoacrylate adhesives by dissolving therein quantities of polymeric alkyl cyanoacrylates, as well as other compounds including polyacrylates, methacrylates and cellulose esters such as acetate, propionate and butyrate.

U.S. Pat. No. 3,836,377 notes among the additional known thickeners polyvinyl ethers such as polyvinylmethyl ether. U.S. Pat. No. 3,692,752 discloses thickened cyanoacrylate solutions containing certain polyether acrylates/methacrylates, acrylic/methacrylic esters of bis(hydroxyalkyl) phosphonic acid derivatives, and acrylic/methacrylic esters of tris(hydroxyalkyl) cyanuric acid derivatives.

The preceding references relate to thickened homogeneous solutions containing organic compounds as thickeners. Various inorganic materials have also been proposed as fillers, which also have the effect of thickening the composition. Thus, U.S. Pat. No. 3,663,501 teaches preparation of a dental cement containing inert, finely-divided solids such as fused silica, quartz and alumina. Similarly, U.S. Pat. No. 3,607,542 teaches the preparation of a water-resistant cyanoacrylate paste containing insoluble, inert fillers such as salts of calcium, titanium, zinc, tin, aluminum, iron and copper, among others. Non-soluble organic fillers are disclosed by U.S. Pat. No. 4,105,715.

U.S. Pat. No. 4,102,945 discloses a cyanoacrylate adhesive composition thickened by a copolymer or terpolymer resin capable of being dissolved or solvated by the cyanoacrylate monomer, resulting in significantly improved peel strength. Preferred thickeners are acrylonitrilebutadiene-styrene terpolymers, methacrylate-butadiene-styrene terpolymers, and vinylidene chlorideacrylonitrile copolymers.

It has now been found that use of elastomeric polymers as fillers in cyanoacrylate systems results in suprisingly beneficial properties.

SUMMARY OF THE INVENTION

According to the invention there is provided a curable adhesive composition having improved toughness when cured, comprising: (a) a monomeric ester of 2-cyanoacrylic acid, and (b) about 0.5 to about 20 parts by weight of the composition of an elastomer, preferably an acrylic rubber, said composition having improved toughness over the corresponding unfilled adhesive composition. It will be appreciated that the upper concentration limit is related inversely to the molecular weight of the rubber and, therefore, could exceed 20 parts by weight if a low molecular weight rubber having suitable performance were used.

The composition also preferably contains one or more known acidic and free radical inhibitors, and optionally other functional additives for such purposes as further improving thermal resistance, providing color, accelerating the cure reaction, providing cross-linking, etc.

The compositions of this invention exhibit substantially increased toughness in comparison with control cyanoacrylate adhesives. It has also been unexpectedly found that the compositions have excellent hot strength, i.e., resistance to thermal degradation of strength properties. This finding was particularly surprising since the addition of low glass transition rubber would not be expected to improve hot strength. It has also been found that these compositions retard or eliminate what may be termed post-cure embrittlement or loss of toughness properties which occurs with cyanoacrylate adhesive bonds upon exposure to heat and then cooling to room temperature.

DETAILED DESCRIPTION OF THE INVENTION

The benefits of this invention are achievable with essentially all adhesive compositions based upon cyanoacrylate esters. Most commonly, the esters have the formual:

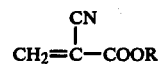

wherein R represents a $C_{1-16}$alkyl, cycloalkyl, alkenyl, cycloalkenyl, phenyl or heterocyclic (such as furfuryl) radical. Naturally, the above R group can contain any linkages or substituents which do not adversely affect the monomer in the performance of its intended function in the cyanoacrylate adhesive compositions, such as strongly basic substituents which may adversely affect the stability of the adhesive compositions. For purposes of this invention, the preferred monomers are those wherein R is a cyclohexyl or a $C_1$ to $C_6$ alkyl or alkenyl radical. Most preferred are methyl and ethyl cyanoacrylates. The esters may be used singly or in admixture.

The above monmeric esters of 2-cyanoacrylic acid can be prepared by methods known in the art, such as those described in U.S. Pat. Nos. 2,467,927 and 3,254,111.

Cyanoacrylate ester adhesive compositions generally contain an anionic inhibitor, e.g., an acidic substance, soluble in the ester of 2-cyanoacrylic acid, which inhibits anionic polymerization. A number of suitable inhibitors of anionic polymerization are well known in the art.

The best known are the soluble acidic gases such as sulfur dioxide, sulfur trioxide, nitric oxide, and hydrogen fluoride. More recently, inhibitors involving organic sultones have been developed, the sultone being generally represented by the formula

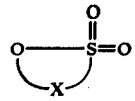

wherein X is an organic radical joining the —S(O$_2$)O— group in a 4, 5, or 6 member heterocyclic ring, preferably a 5 member heterocyclic ring. Preferably, X is a hydrocarbon group, although it can contain any substituents or linkages which do not adversely affect the sultone for its intended use as a stabilizer of the adhesive composition. Another excellent class of stabilizers are the organic sulfonic acids, preferably having a molecular weight less than about 400. To be optimally useful as a stabilizer in the adhesive compositions, the sulfonic acid should have a pKA value (dissociation constant in water) of less than about 2.8, and preferably less than about 1.5.

Recently, the beneficial effects of certain stabilizer formulations based on sulfonic acids in combination with sulfur dioxide have been disclosed in copending U.S. patent application Ser. No. 06/157,149, filed June 6, 1980. Particularly preferred for purposes of this invention are combinations of methane sulfonic acid (MSA) or hydroxypropane sulfonic acid (HPSA) with sulfur dioxide. Preferred concentrations of sulfonic acids range from about 5 to about 100, more preferably about 10 to about 50, parts per million (based on monomer weight). The preferred concentrations of S$o_2$ range from about 15 to about 50 ppm for either acid.

While not essential, the cyanoacrylate adhesive compositions of this invention generally also contain an inhibitor of free radical polymerization. The most desirable of these inhibitors are of the phenolic type, such as quinone, hydroquinone, t-butyl catechol, p-methoxyphenol, etc.

The above inhibitors may be used within wide ranges, but the following general guidelines are representative of common practice, all figures being weight percent of the adhesive composition: acidic gases—from about 0.001% to about 0.06% by weight; sultones—from about 0.1% to about 10% by weight; sulfonic acids—from about 0.0005% to about 0.1% by weight; free radical inhibitors—from about 0.001% to about 1%.

Other common additives for cyanoacrylate adhesive compositions are placticizers. Plasticizers serve to make the cured bonds less brittle and, therefore, more durable. The most common of these plasticizers are C$_1$ to C$_{10}$alkyl esters of dibasic acids such as sebasic acid and malonic acid. Other plasticizers, such as diaryl ethers and polyurethanes, also may be used, and a variety of other plasticizers is also known.

In addition to the monomer, or mixture of monomers, the second required ingredient is an elastomeric polymer filler of at least one of the types described below. In order to perform suitably, the polymer, or mixture of polymers must be "compatible" with the cyanoacrylate monomer. By the term "compatible" is meant that the polymers do not significantly interfere with the storage stability of the adhesive composition. Moreover, as will be discussed further below, it appears that the polymers should be at least partially solvated by the cyanoacrylate monomer so that a homogeneous solution or suspension is formed. Molecular weight is considered to be a significant parameter in selecting suitable polymeric fillers of the types specified; however, selected of molecular weight is deemed to be a matter of choice. Obviously, such factors as solubility and thickening ability are affected, but selection of molecular weight in these respects is well within the skill of the art based upon routine experimentation.

Each of the fillers of this invention is unique in that it imparts a higher toughness to standard adhesive bonds formed using a cyanoacrylate adhesive composition containing it than the toughness of similar bonds formed using the same composition without any fillers, or using the same composition filled by means other than members of the said group of alternative fillers.

As already indicated, the fillers of this invention are organic polymers which are elastomeric, i.e., rubbery, in nature. Numerous chemical species fall into this category but, for illustration purposes, the following species have been found to be particularly useful: acrylic rubbers (which are the preferred species); polyester urethanes; ethylene-vinyl acetates; fluorinated rubbers; isoprene-acrylonitrile polymers; chlorosulfinated polyethylenes; and homopolymers of polyvinyl acetate.

The acrylic rubbers of the instant invention may be selected from a wide range of suitable materials. Most frequently these rubbers are either: (i) homopolymers of alkyl esters of acrylic acid; (ii) copolymers of another polymerizable monomer, such as lower alkenes, with an alkyl ester of acrylic acid or with an alkoxy ester of acrylic acid; (iv) copolymers of alkyl esters of acrylic acid; (v) copolymers of alkoxy esters of acrylic acid; (vi) mixtures of any of the above (i)–(v). Other unsaturated monomers which may be copolymerized with the alkyl and alkoxy esters of acrylic include dienes, reactive halogen-containing unsaturated compounds and other acrylic monomers such as acrylamides. It will be understood that esters or methacrylic acid tend to be relatively brittle; however, to the extent they provide beneficial results in toughness and thermal resistance, they are intended to be included within the scope of this invention.

The choice of the elastomer will, to a large degree, dictate various properties and characteristics of the adhesive composition and such choices are easily determined through general experimentation and known methods within the art. It is most effective to use elastomers whose molecular weight averages more than about 100,000, but any molecular weight greater than 5,000 would be expected to effect an improvement. As a principle of general guidance, the molecular weight should be high enough to produce toughening but not so high that the adhesive is very stringy and difficult to apply. It is also best to choose an elastomer whose Mooney viscosity is between 20 and about 60, and whose glass transition temperature (Tg) is 15° C. or less. The Mooney viscosity is defined as the amount of torque or resistance required to revolve a rotor at a constant speed in a polymer at a constant temperature. The Mooney viscosities of the preferred rubbers of the instant invention are described by the manufacturing as ML(1+4). The (1+4) symbol is to indicate the time involved in measuring the polymer viscosity. The "1" indicates a one minute pre-heating time, which is to bring the rotor to the designated temperature. The "4" indicates that the torque reading is to be taken after four minutes of rotating the rotor. The readings are measured on a scale usually of 0–100. There are no specific units involved. These specific limitations are not absolute and various acrylic rubbers which do not fall within them may be within the scope of this invention.

One preferred group of acrylic rubbers consists of the copolymers of ethyl acrylate with 2-chloroethyl vinyl ether in the approximate molecular ratio of 95:5, respectively. One such acrylic rubber is manufactured by the B. F. Goodrich Company, and is marketed under the name Hycar, such as Hycar 4021. Other preferred acrylic rubbers are the copolymers of methyl acrylate and ethylene, manufactured by Du Pont, under the name of Vamac, such as Vamac N123 and Vamac B124. A third group of preferred rubbers is manufactured by American Cyanamid under the name Cyanacryl and includes rubbers known as Cyanacryl R, Cyanacryl L and Cyanacryl C. It has been found that Cyanacryl rubbers, when used "as is," tend to destabilize the cyanoacrylate monomer. This problem can usually be corrected by washing the rubber with dilute HCL, rinsing and oven drying it prior to adding it to cyanoacrylate.

The Hycar rubbers are high molecular weight rubbers, typically having a Mooney viscosity at 100° C. of between about 25 and 60 ML(1+4), and a glass transition temperature range of about −15° C. to about −40° C. Hycar 4021 has a Mooney viscosity of about 40 minimum and a glass transition temperature (Tg) of about −15° C.

Vamac N123 has a Mooney viscosity of about 30 and a glass transition temperature (Tg) of about −20° C.; Vamac B124 has a Mooney viscosity of about 20. Cyanacryl R is reported to have a Mooney viscosity of about 42 to about 51 and a glass transition temperature (Tg) of about −18° C., while Cyanacryl L and C have Mooney viscosities between about 30–48 and glass transition temperatures of −24° C. and −32° C. respectively. These data have been procured from the manufacturers' technical literature.

The concentration range of elastomeric polymer should be about 0.5 to about 20 percent by weight, preferably 1.5 to about 15 percent, based on the weight of the composition.

While beneficial effects will be realized with rubbers which are merely "compatible," as defined herein, it is preferred that the rubbers be dissolved in the monomer. All of the above preferred acrylic rubbers are solid materials which are preferably masticated on a mill prior to dissolution in the acrylic ester monomers. Mastication aides the dissolution by breaking down the molecular weight and reducing the physical and chemical cross-links. Properties of the cured adhesive composition will vary somewhat with the degree of mastication, the effects of which may be determined with routine experimentation for any given acrylic rubber. These solid rubbers should show little or no sign of phase separation once fully dissolved in the monomer.

The improved toughness of the cured compositions of this invention is manifested through various physical properties, e.g., 180° peel strength, impact strength and tensile shear strength.

These strengths are useful properties of an adhesive bond, being parameters of what is loosely referred to as the bond strength. Referring for simplicity to the procedures of American Standard Test Methods, peel strength is determined in accordance with ASTM No. D 903-49; impact strength is determined in accordance with ASTM No. D-950; and tensile shear strength is determined in accordance with ASTM No. D-1002. The reader is referred to these standards for a full description of the tests.

EXAMPLES

The following examples are intended to illustrate, not limit, the invention.

EXAMPLE 1

The typical procedure for preparing an adhesive composition of this invention is as follows:
1. A high-purity (i.e., over 99% pure) alkyl cyanoacrylate monomer is stabilized to 30 ppm MSA.
2. The elastomer is diced into small pieces and the monomer is heated to 45°–50° C.
3. The elastomer is added in several equal portions over a period of an hour; the batch temperature is raised to 50°–55° C. and maintained there.
4. The batch is stirred or milled, as necessary, for 3–4 hours at temperature until the elastomer is dissolved.
5. The batch is cooled to room temperature and additionally stabilized with 40 ppm $SO_2$.

In order to ensure that the composition so prepared has adequate stability for commercial use, a sample of the composition is placed in a test tube and kept in a water bath at 82° C. until incipient gellation can be detected in the composition.

TABLE I

| Adhesive | Physical Properties of Filled Adhesives | | | | | | | | | | |
|---|---|---|---|---|---|---|---|---|---|---|---|
| | A | B | C | D | E | X-1 | X-2 | X-3 | F | G | H |
| CA Type | ethyl | ethyl | methyl | methyl | ethyl | ethyl | ethyl | ethyl | | | |
| Stabilizer | HPSA | HPSA | HPSA | HPSA | MSA | MSA/$SO_2$ | MSA/$SO_2$ | MSA/$SO_2$ | | | |
| Level, ppm | 30 | 18 | 22 | 22 | 10 | 30/40 | 30/40 | 30/40 | | | |
| Filler | PMMA | — | PMMA | PMMA | — | B-124 | B-124 | B-124 | | | |
| Level, parts | 5 | — | 5 | 3 | — | 10 | 10 | 10 | | | |
| Impact Strength | | | | | | | | | | | |
| Room Temp. cure | | | | | | | | | | | |
| 24 hrs. | 9.0 | 10.5 | 10.3 | 9.0 | 10.4 | 8.7 | 9.7 | 8.0 | 9.1 | 9.9 | 9.5 |
| 5 days | 8.5 | 10.5 | 11.0 | 10.1 | 8.7 | | | | 7.8 | 7.8 | 10.2 |
| 6 days | | | | | | 10.0 | 10.2 | 10.6 | | | |
| Post-cured @ 250° F. | | | | | | | | | | | |
| 2 hrs. | 9.6 | 1.5 | 9.0 | 1.1 | 8.5 | 13.7 | 12.6 | 13.3 | 1.4 | 4.3 | 5.7 |
| 24 hrs. | 2.0 | 2.1 | 1.2 | 1.0 | 1.8 | | | | 1.0 | 2.0 | 2.2 |
| 180° Peel Strength | | | | | | | | | | | |
| Room Temp. cure | | | | | | | | | | | |
| 24 hrs. | 23.0 | | | | 14.0 | 32.3 | 31.6 | | 4.0 | 5.5 | 20.0 |
| 6 days | | | | | | 34.3 | 32.0 | | 10.0 | 3.0 | 18.0 |
| Post-cured @ 250° F. | | | | | | | | | | | |
| 2 hrs. | | | | | | 39.5 | 41.0 | | 0 | 1.0 | 1.0 |
| 24 hrs. | | | | | | 12.0 | | | | | |
| Tensile Shear Strength | | | | | | | | | | | |
| Room Temp. Cure | | | | | | | | | | | |
| 5 days | 3020 | 3050 | 3690 | 3690 | 3010 | 3090 | 3380 | | 2930 | 3370 | 3080 |
| Post-cured @ 250° F. | | | | | | | | | | | |
| 2 hrs. | 2750 | 2350 | 3190 | 590 | 2190 | 3770 | 3870 | | 1700 | 2050 | 1730 |
| 24 hrs. | 1410 | 1430 | 550 | 160 | 1470 | 3920 | | | 360 | 1070 | 1330 |

TABLE I-continued

| | Physical Properties of Filled Adhesives | | | | | | | | | |
|---|---|---|---|---|---|---|---|---|---|---|
| Adhesive | A | B | C | D | E | X-1 | X-2 | X-3 | F | G | H |
| Tested a 250° F. Post-cured @ 250° F. | | | | | | | | | | |
| 1 hr. | 620 | 1890 | | | | 2430 | 2280 | 2170 | | |
| 2 hrs. | 105 | 1600 | | | | 2430 | 2270 | 2160 | | |

If no gellation occurs for at least two days at 82° C., the stability is considered satisfactory.

It will be understood that the procedure given above may not be optimum for all elastomers within the scope of this invention. For instance, the minimum adequate temperature may be found to be higher or lower, or the period of dissolution may be longer or shorter than one hour. Also, it may not be necessary in all cases to obtain complete solution of the elastomer in order to achieve the beneficial effects of this invention. Determination of such factors is considered to be a matter of routine experimentation within the skill of the art and cannot be conveniently described here for all useful formulations.

EXAMPLE 2

Using the procedure described in Example 1, several experimental adhesive compositions were prepared. Table I sets out a variety of comparative data showing the beneficial results of using Vamac B-124, an acrylic rubber of this invention. Compositions containing this filler are designated X-1, X-2 and X-3. Of particular interest are the superior thermal properties of these compositions. Samples A-C are commercially available cyanoacrylate adhesives of Loctite Corporation, Newington, Conn. Samples A, C and D contain polymethyl methacrylate (PMMA), a commonly used filler of the prior art. Samples F-H are cyanoacrylate adhesive compositions of other manufacturers available through normal commercial channels. Sample E is cyanoacrylate monomer in "neat" form, i.e., not formulated into a commercially saleable adhesive composition.

Impact strength data are expressed in ft.-lbs. per sq. inch; peel strength data are in lbs. per inch of width; tensile shear strength data are in lbs. per sq. inch. Concentrations of materials are based on the composition as a whole, except for the stabilizer concentrations in ppm, which are based on the monomer weight.

EXAMPLE 3

Using the procedure of Example 1, a variety of elastomeric polymers are made into adhesive compositions. Tests similar to those shown in Example 2 indicate that general improvement in toughness is obtained over control compositions not containing a filler of this invention. Elastomers included in this Example, and typical of the useful elastomers, are shown in Table II.

TABLE II

Some Other Useful Elastomers

| Trade Name | Chemical Species | Suggested Concentration Range % | Source |
|---|---|---|---|
| Q-thane PA-10 | Polyester-urethane | 0.5–2.5 | K.J. Quinn, Inc., Malden, MA |
| PA-30 | Polyester-urethane | 0.5–2.5 | |
| PS-80 | Polyester-urethane | 3.0–3.5 | |
| Vamac N-123 | Ethylene-methyl acrylate | 3.0–3.5 | E.I. duPont de Nemours, Wilmington, DE |
| Vynathene EY-907 | Ethylene-vinyl acetate | 4.0–11.0 | U.S. Industrial Chemical Co., New York, NY |
| — — | Polyvinyl acetate (MW=195,000) | 16.0–17.0 | Scientific Polymer Products, Inc. Ontario, NY |
| Viton C-10 | Fluorinated rubber | 15.0–30.0 | E.I. duPont de Nemours |
| E-60 | Fluorinated rubber | 15.0–30.0 | Wilmington, DE |
| Krynac 833 | Isoprene-acrylonitrile | less than 1.0 | Polypar, Inc., Akron, OH |

I claim:

1. A curable adhesive comprising a substantially solvent-free mixture of:
   (a) a monomeric ester of 2-cyanoacrylic acid, and
   (b) about 0.5% to about 20% by weight of an elastomeric polymer selected from the group consisting of elastomeric copolymers of a lower alkene monomer and (i) acrylic acid esters (ii) methacrylic acid esters or (iii) vinyl acetate.

2. A composition of claim 1 wherein the elastomeric polymer is a copolymer of a lower alkene monomer with an alkyl ester of acrylic or methacrylic acid.

3. A composition of claim 1 wherein the elastomeric polymer is a copolymer of a lower alkene monomer with an alkoxy ester of acrylic or methacrylic acid.

4. A composition of claim 1 containing in addition a stabilizing amount of an acidic stabilizer and a free radical inhibitor.

5. A composition of claim 1 wherein the monomeric ester is methyl cyanoacrylate or ethyl cyanoacrylate.

6. A composition of claim 1 wherein the concentration of the elastomeric polymer is about 1.5% to about 15% by weight.

7. A composition of claim 1 wherein the elastomeric polymer is an ethylene-methyl acrylate copolymer.

8. A composition of claim 1 wherein the elastomeric polymer is an ethylene-vinyl acetate copolymer.

* * * * *